(12) United States Patent
Zheng (10) Patent No.: US 11,356,593 B2
(45) Date of Patent: Jun. 7, 2022

(54) METHODS AND SYSTEMS FOR SINGLE FRAME AUTOFOCUSING BASED ON COLOR- MULTIPLEXED ILLUMINATION

(71) Applicant: University of Connecticut, Farmington, CT (US)

(72) Inventor: Guoan Zheng, Vernon, CT (US)

(73) Assignee: University of Connecticut, Farmington, CT (US)

( * ) Notice: Subject to any disclaimer, the term of this patent is extended or adjusted under 35 U.S.C. 154(b) by 184 days.

(21) Appl. No.: 16/869,190

(22) Filed: May 7, 2020

(65) Prior Publication Data

US 2020/0358946 A1   Nov. 12, 2020

Related U.S. Application Data

(60) Provisional application No. 62/844,983, filed on May 8, 2019.

(51) Int. Cl.
*H04N 7/18* (2006.01)
*H04N 5/232* (2006.01)
(Continued)

(52) U.S. Cl.
CPC ....... *H04N 5/23212* (2013.01); *G02B 21/006* (2013.01); *G02B 21/0064* (2013.01); *G02B 21/0072* (2013.01); *G02B 21/12* (2013.01); *G02B 21/365* (2013.01); *H04N 5/23232* (2013.01); *G06T 7/557* (2017.01);
(Continued)

(58) Field of Classification Search
CPC .......... H04N 5/23212; H04N 5/23232; H04N 9/045; H04N 5/2256; G02B 21/006; G02B 21/0064; G02B 21/0072; G02B 21/12; G02B 21/365; G02B 7/28; G02B 21/244; G02B 21/245; G06T 7/557; G06T 7/571; G06T 7/586; G06T 7/70
See application file for complete search history.

(56) References Cited

U.S. PATENT DOCUMENTS 9,743,020 B2   8/2017   Zheng et al.
9,864,184 B2   1/2018   Ou et al.
(Continued)

OTHER PUBLICATIONS

Abels, Esther et al., Current State of the Regulatory Trajectory for Whole Slide Imaging Devices in the USA, Journal of Pathology Informatics 2017;8:23.
(Continued)

*Primary Examiner* — Richard T Torrente
(74) *Attorney, Agent, or Firm* — McCarter & English, LLP (57) ABSTRACT

The present disclosure includes systems and methods for capture a whole slide image of a sample. In exemplary embodiments, a camera is configured to capture a digital image of a sample. The system captures a bright field image of the sample, and captures a digital image of the sample illuminated from a first incident angle at a first wavelength and a second incident angle at a second wavelength. The system can determine whether the sample is defocused based on the transitional shift between a first wavelength channel and a second wavelength channel of the captured digital image. The system can determine the defocus distance based on the transitional shift and autofocus using the defocus distance such the bright field image is in focus.

14 Claims, 5 Drawing Sheets

(51) Int. Cl.
G02B 21/36 (2006.01)
G02B 21/00 (2006.01)
G02B 21/12 (2006.01)
G06T 7/557 (2017.01)
G06T 7/571 (2017.01)
G06T 7/586 (2017.01)
G06T 7/70 (2017.01)

(52) U.S. Cl.
CPC .............. G06T 7/571 (2017.01); G06T 7/586 (2017.01); G06T 7/70 (2017.01)

(56) References Cited

U.S. PATENT DOCUMENTS

| | | | |
|---|---|---|---|
| 10,330,906 | B2 | 6/2019 | Zheng |
| 10,477,097 | B2 | 11/2019 | Zheng |
| 2018/0329194 | A1* | 11/2018 | Small ............... G06V 20/698 |
| 2019/0302440 | A1* | 10/2019 | Stoppe ............. G01N 21/8806 |
| 2020/0029012 | A1 | 1/2020 | Zheng |
| 2020/0310097 | A1 | 10/2020 | Zheng |
| 2020/0310099 | A1 | 10/2020 | Zheng |

OTHER PUBLICATIONS

Ghaznavi, Farzad et al., Digital Imaging in Pathology: Whole-Slide Imaging and Beyond, Annu. Rev. Pathol. Mech. Dis. 2013.8:331-359.
Gilbertson, John R. et al., Primary histologic diagnosis using automated whole slide imaging: a validation study, BMC Clinical Pathology 2006, 6:4.
Guo, Kaikai et al., Fourier Ptychography for Brightfield, Phase, Darkfield, Reflective, Multi-Slice, and Fluorescence Imaging, IEEE Journal of Selected Topics in Quantum Electronics, vol. 22, No. 4, Jul./Aug. 2016.
Janowczyk, Andrew et al., Deep learning for digital pathology image analysis: A comprehensive tutorial with selected use cases, Journal of Pathology Informatics 2016;7:29.
Li, Wentian, Mutual Information Functions Versus Correlation Functions, Journal of Statistical Physics, 60(5-6):823-837 (1990).
Liao, Jun et al., Single-frame rapid autofocusing for brightfield and fluorescence whole slide imaging, Biomedical Optics Express, vol. 7, No. 11, Nov. 1, 2016.
Liao, Jun et al., Rapid focus map surveying for whole slide imaging with continuous sample motion, Optics Letters, vol. 42, No. 17, Sep. 1, 2017.
Liao, Jun et al., Dual light-emitting diode-based multichannel microscopy for whole-slide multiplane, multispectral and phase imaging, Journal of Biophotonics. 2018; 11.
Massone MD, Cesare et al., Feasibility and diagnostic agreement in teledermatopathology using a virtual slide system, Human Pathology (2007) 38, 546-554.
McKay, Richard R. et al., The accuracy of dynamic predictive autofocusing for whole slide imaging, J Pathol Inform 2011;2:38.
Montalto, Michael C. et al., Autofocus methods of whole slide imaging systems and the introduction of a second-generation independent dual sensor scanning method, J Pathol Inform 2011;2:44.
Pluim, Josien P. et al., Mutual-Information-Based Registration of Medical Images: A Survey, IEEE Transactions on Medical Imaging, vol. 22, No. 8, Aug. 2003.
Yazdanfar Siavash et al., Simple and robust image-based autofocusing for digital microscopy, Optics Express, vol. 16, No. 12, Jun. 9, 2008.
Zheng, Guoan et al., Microscopy refocusing and dark-field imaging by using a simple LED array, Optics Letters, vol. 36, No. 20, Oct. 15, 2011.
Zheng, Guoan et al., Wide-field, high-resolution Fourier ptychographic microscopy, Nature Photonics, vol. 7, Sep. 2013.
International Search Report and Written Opinion from related International Patent Application No. PCT/US2020/031893 dated Aug. 6, 2020.
Jiang et al. Rapid and robust whole slide imaging based on LED-array illumination and color-multiplexed single-shot autofocusing Quantitative Imaging in Medicine and Surgery. Online publication date no earlier than May 22, 2019 based on communication from publisher. [Retrieved Jul. 18, 2019). Retrieved from internet: <http://dx.doi.org/10.21037/qims.2019.05.04> entire document.

* cited by examiner

METHODS AND SYSTEMS FOR SINGLE FRAME AUTOFOCUSING BASED ON COLOR- MULTIPLEXED ILLUMINATION

CROSS REFERENCE TO RELATED APPLICATIONS

The present application claims the benefit of U.S. Provisional Patent Application No. 62/844,983, filed on May 8, 2019, which is incorporated herein by reference in its entirety.

STATEMENT OF GOVERNMENT SUPPORT

This invention was made with Government support under Grants 1555986 and 1700941 awarded by the National Science Foundation. The government has certain rights in the invention.

FIELD OF THE DISCLOSURE

The present disclosure relates generally to the field of imaging techniques, equipment and systems and, more particularly, to microscopy/imaging assemblies with single-frame sample auto focusing using various modes of illumination.

BACKGROUND OF THE DISCLOSURE

Applications of whole slide imaging technologies of conventional slide tissues in order to produce a digital representation span a wide range of areas including technologies for better and faster prediction, diagnosis, and prognosis of cancers and other diseases. One promising approach is based on whole slide imaging and artificial intelligence for primary diagnosis.

In traditional whole slide imaging systems, the tissue slide is scanned at different spatial positions using a high-resolution objective lens to acquire digital images. Typically, the high-resolution objective lens has a numerical aperture greater than 0.75 and a concomitant resulting depth of field measured in microns. The small depth of field in whole slide imaging systems makes acquiring in focus images of tissue sections with uneven topography challenging. Not surprisingly, poor focus is cited as the main reason for poor image quality in whole slide imaging systems in literature. Therefore, in traditional whole slide imaging systems autofocusing strategy is an important consideration. In order to improve image quality, traditional whole slide imaging systems generate a focus map prior to scanning, and for each focus point on the focus map, the system scans the sample at different axial positions to acquire a z-stack. The acquired z-stack images are further processed according to a figure of merit, such as Brenner gradient or entropy and the best focal position is identified. For example, the system can determine the best focal position by identifying a position that corresponds to the image with a maximum figure of merit. This process of improving the image quality by identifying the best focal position is repeated for other tiles of the tissue slide. However, surveying the focus positions for every tile is prohibitively time intensive, and therefore most traditional system employ a sampling of a subset of tiles for focus point mapping. For example, the system can select at least 25 tiles for focus point mapping and interpolate the results to re-create the focus map for the entire tissue slide.

However, focus map sampling methods in traditional whole slide imaging systems have two major limitations: significant time overhead during creation of the focus map; and significant positional accuracy and repeatability of mechanical systems to reposition the sample during subsequent scanning process. For example, in order to acquire the z-stack the sample has to be static, without continuous x-y motion which increases the time overhead. Furthermore, knowledge of the absolute axial position of the sample is necessary to bring the sample back to the right position during the later scanning operation. These limitations increase the cost of traditional whole slide imaging, which makes the traditional whole slide imaging system cost prohibitive for many applications, such as frozen section procedure during surgery.

In order to address these limitations, traditional whole slide imaging systems use additional cameras to perform dynamic focusing with the sample in continuous motion. However, use of multiple cameras and alignment to the microscope systems is not compatible with traditional whole scale imaging platforms and increases the complexity of the system and increases the cost. In contrast, single camera systems for rapid focus map surveying do not address the issues such as overhead time and reliance on high positional accuracy and repeatability of mechanical systems.

Systems and methods of the present disclosure disclose single-frame autofocusing scheme based on color multiplexed illumination to address these and other needs effectively.

SUMMARY OF THE DISCLOSURE

Embodiments of the present disclosure include systems and methods for single-frame autofocusing scheme based on color multiplexed illumination. In exemplary embodiments, the system includes a camera configured to capture a digital image of a sample, a plurality of light sources configured to illuminate the sample from different incident angles at different wavelengths, capture a digital image of the illuminated sample, determine whether there is a translational shift between the different wavelength channels in the captured image; and determine the defocus distance based on the translational shift between the different wavelength channels. In exemplary embodiments, the system can autofocus based on the determined defocus distance.

In exemplary embodiments, the sources can be light emitting diode, laser diode, halogen lamp with a filter and the like. In exemplary embodiments, the plurality of light sources can be one light source with one or more filters configured to illuminate the sample from different incident angles at different wavelengths.

In exemplary embodiments, the sample is illuminated from the first incident angles with a red light source and from the second incident angle with a green light source. In exemplary embodiments, the sample is illuminated from the first incident angles with a red light source and from the second incident angle with a blue light source. In exemplary embodiments, the sample is illuminated from the first incident angles with a green light source and from the second incident angle with a blue light source. In exemplary embodiments, the sample is illuminated from the first incident angles with a green light source and from the second incident angle with a blue light source and from a third incident angle with a red light source.

In exemplary embodiments, the system can determine a cross-talk first wave length channel and a cross-talk second wavelength channel of the captured digital image of the sample illuminated by the first and a second wavelength light at the first and second incident angles respectively. The system can determine a first wavelength channel of the captured image illuminated with only the first wavelength light at the first incident angle. The system can determine a second wavelength channel of the captured image illuminated with only the second wavelength light at the second incident angle. The system can determine cross-talk coefficients based on the cross-talk first wavelength channel, the cross-talk second wavelength channel, the first wavelength channel and the second wavelength channel. The system can determine a corrected first wavelength channel and a corrected second wavelength channel based on the cross-talk first wavelength channel, second wavelength channel and the cross-talk coefficients.

In exemplary embodiments, the system can plot a cross-correlation between the corrected first wavelength channel and the corrected second wavelength channel; and determine the maximum point of the cross-correlation plot.

In exemplary embodiments, the system can maximize the mutual information between the corrected first wavelength channel and the corrected second wavelength channel based on gradient descent.

Any combination or permutation of embodiments is envisioned. Additional advantageous features, functions and applications of the disclosed assemblies, systems and methods of the present disclosure will be apparent from the description which follows, particularly when read in conjunction with the appended figures. The references, publications and patents listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF THE DISCLOSURE

The exemplary embodiments disclosed herein are illustrative of methods and related systems to capture a whole slide image of a sample, particularly autofocusing the whole slide image. The system can autofocus the whole slide image based on a digital image of the sample illuminated by a first wavelength light at a first incident angle and by a second wavelength light at a second incident angle. Details disclosed herein with reference to exemplary systems/assemblies and associated processes/techniques of assembly and use are not to be interpreted as limiting, but merely as the basis for teaching one skilled in the art how to make and use the advantageous assemblies, systems and methods of the present disclosure.

Figure 1:
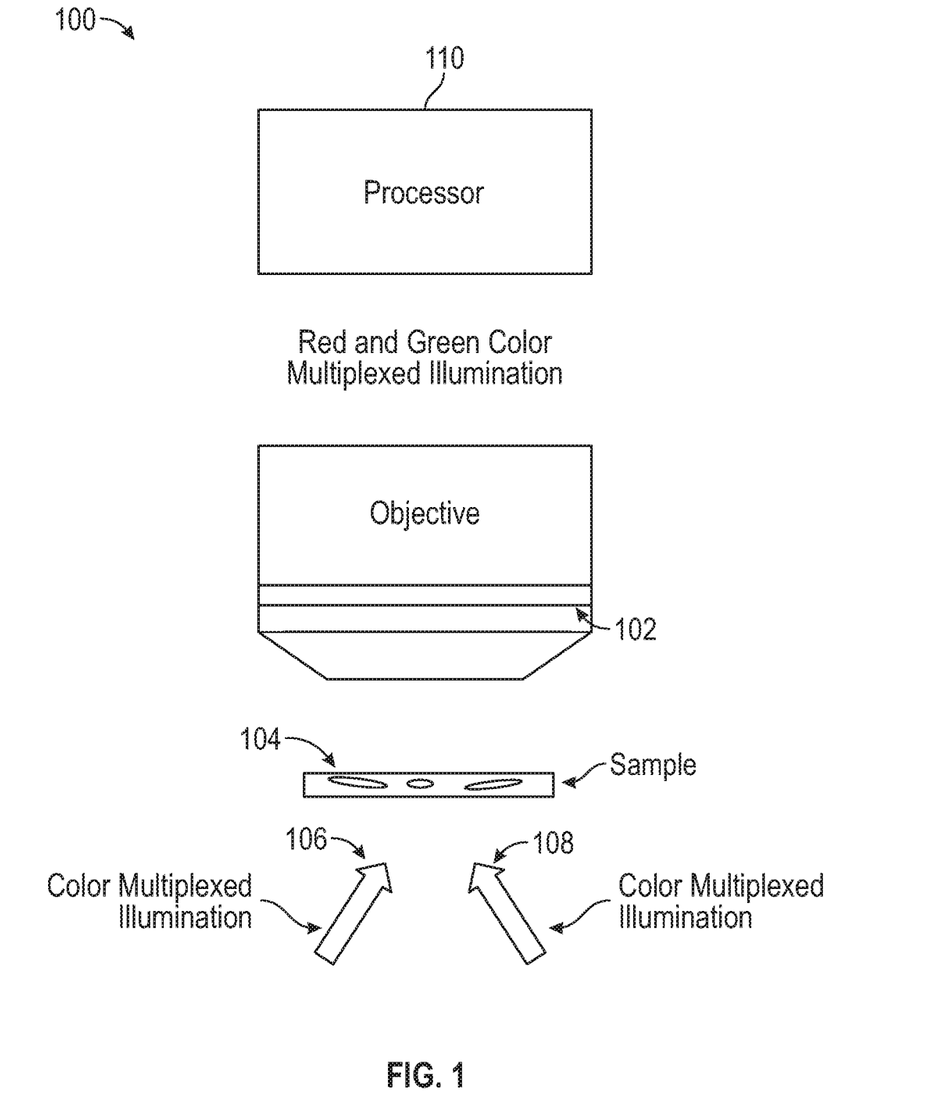
FIG. 1 is an illustration of the system to capture a whole slide imaging according to the present disclosure.

Whole slide imaging is a method to produce a digital representation of tissue samples or sample using a camera and image processing techniques. With reference to FIG. 1, an illustration of a system to capture a whole slide image according to the present disclosure is provided. The system 100 includes a processor 110 operatively coupled to a microscope system with a digital camera 102 configured to capture a digital image of a sample 104, and a plurality of light sources 106, 108 configured to illuminate the sample from different incident angles at different wavelengths, i.e., color multiplexed illumination. For example, the light source 106 can produce green light that is incident on the sample 104 at a first incident angle and the light source 108 can produce red light that is incident on the sample 104 at a second incident angle. In exemplary embodiments, the plurality of light sources 106, 108 can be light emitting diodes, laser diode, halogen lamp with a filter and the like. The system 100 can include a processor or a computing system that can process the images captured by the camera.

The microscope system 102 can capture a digital image of the illuminated sample 104. In an example, the microscope system 102 can capture a regular bright field high-resolution image of the sample and/or a color image of the sample 104 illuminated by the color multiplexed illumination. The captured color digital image can be used for autofocusing. The microscope system 102 can be optically or computationally focused. In an example, the sample 104 can be moved relative to the microscope system 102 in the three dimensions (i.e., x, y, and z). For example, the sample can be moved closer to or away relative to the camera in the z direction. Similarly, the relative position of the microscope system 102 and the sample 104 can be moved in the x and/or y plane to focus a different part of the slide or tile of the sample 104. In an exemplary embodiment, the microscope system 102, the sample 104 or both can move to change the relative position between the microscope system 102 and the sample 104.

Figure 2A:
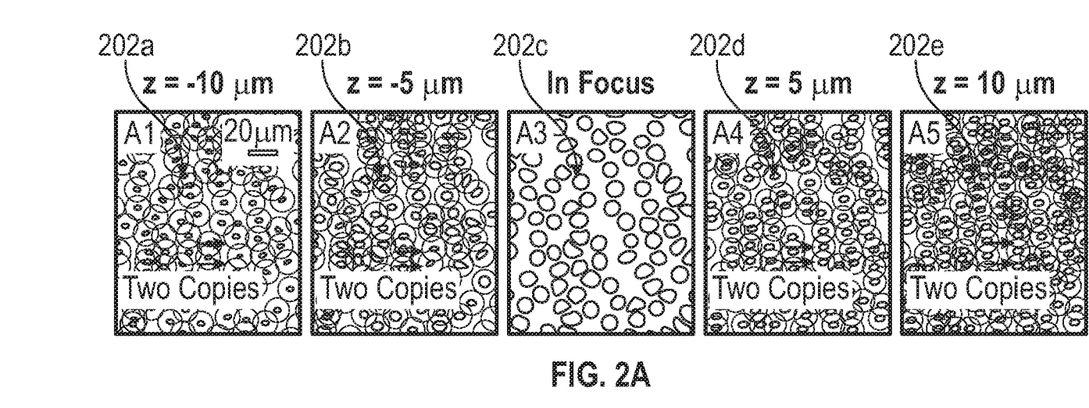
FIG. 2 illustrates a digital image of a sample illuminated by a first wavelength light source at a first incident angle and by a second wavelength light source at a second incident angle according to the present disclosure.
Figure 2B:
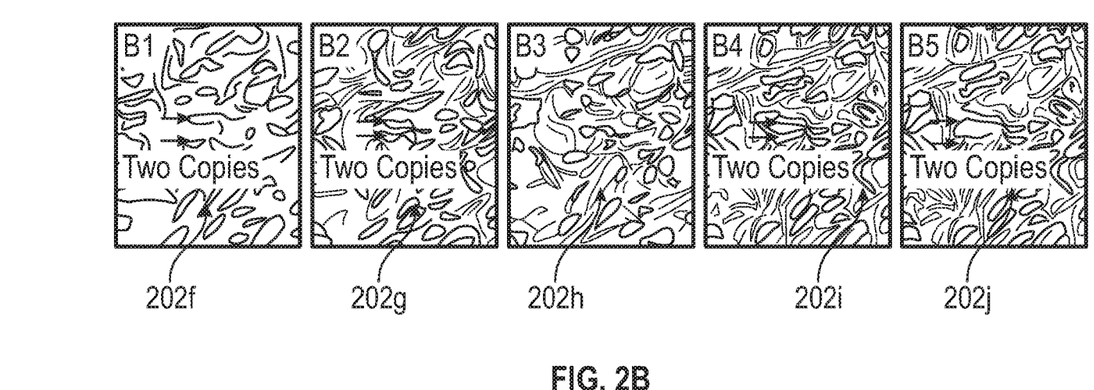
Figure 2C:
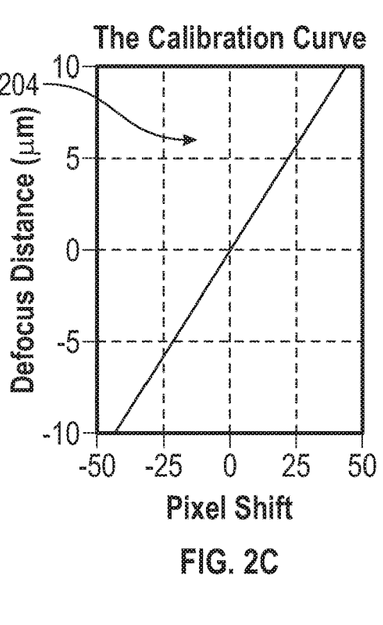

Turning to FIG. 2, the system 100 can capture a digital image 202*a-j* of the sample 104 illuminated by a first wavelength light source 106 at a first incident angle and by a second wavelength light source 108 at a second incident angle. The captured digital image 202*a-j* will show a translational shift between the first wavelength channel and the second wavelength channel when the sample 104 is not in focus. For example, the system 100 can capture the digital image 202*a-j* of the sample 104 illuminated at two different incident angles by a red light source and a green light source to determine the translational shift between the red light channel and the green light channel in the captured image.

The system 100 can also determine whether the sample 104 is at a defocused position based on the translational shift. The system 100 can determine the translational shift between the first wavelength channel and the second wavelength channel from the captured digital image 202*a-j* to autofocus the slide and improve the image quality of the digital representation.

The captured digital images 202*a-j* also illustrate two z-stacks in the two rows captured by the system depicting a blood smear and a kidney cancer tissue. The captured digital images 202a-j shows that the separation between the first wavelength channel and the second wavelength channel increases as the position of the sample moves further away from the in-focus position. For example, on either side of captured digital image 202c and 202h which are in-focus representations of z-stacks, the translational shift increases as the sample position moves away from the in-focus position. For example, captured image 202b has a z shift of 5 micrometer, and the image 202a has a shift of 10 micrometer in relation to the in-focus image 202c when the sample 104 is not placed at the in-focus z-position of the microscope system 102.

The system 100 can determine or plot a calibration curve 204. The calibration curve 204 depicts the relationship between the translational shift (in pixels) or pixel shift and the defocus distance. The slope of the calibration curve 204 is based, at least in part, on the incidence angle of the first wavelength light source and the second wavelength light source illuminating the sample 104. The system can determine the defocus distance from the calibration curve 204 based on the transitional shift between the first wavelength channel and the second wavelength channel.

The captured digital image 202a-j of a sample 104 illuminated by a first wavelength light source 106 at a first incident angle and by a second wavelength light 108 at a second incident angle can be modelled using a color-crosstalk model. For example, when there are two different wavelength lights incident (e.g., red and green light sources) at two different incident angles, the color-crosstalk model can be described as follows:

$$I_R(x,y) = O_R(x,y) + w_{gr} \cdot O_G(x,y) \tag{1}$$

$$I_G(x,y) = w_{rg} \cdot O_R(x,y) + O_G(x,y) \tag{2}$$

where $I_R(x,y)$ and $I_G(x,y)$ are the first wavelength channels and the second wavelength channels (e.g., red and green channels) of the captured color digital image 202a-j with both the first wavelength light 106 and the second wavelength light source 108 (e.g., red and green light sources) turned on simultaneously. $O_R(x,y)$ is the first wavelength channel (e.g., red channel) of the captured image 202a-j under the illumination of only the first wavelength light source (e.g., red light source). $O_G(x,y)$ is the second wavelength channel (e.g., green channel) of the captured digital image 202a-j under the illumination of only the second wavelength light source (e.g., green light source). $w_{rg}$ and $w_{gr}$ are color-crosstalk coefficients, which can be estimated via:

$$w_{gr} \approx \frac{1}{M \cdot N} \sum_{x,y} \frac{I_R(x,y) - O_R(x,y)}{O_G(x,y)} \tag{3}$$

$$w_{rg} \approx \frac{1}{M \cdot N} \sum_{x,y} \frac{I_G(x,y) - O_G(x,y)}{O_R(x,y)} \tag{4}$$

Based on the estimated $w_{gr}$ and $w_{rg}$, the color-corrected first and second wave-length channels (e.g., red and green channels) can be obtained via:

$$I_{R,corrected}(x,y) = \frac{I_R(x,y) - w_{gr} \cdot I_G(x,y)}{1 - w_{gr} \cdot w_{rg}} \tag{5}$$

$$I_{G,corrected}(x,y) = \frac{w_{rg} \cdot I_R(x,y) - I_G(x,y)}{w_{gr} \cdot w_{rg} - 1} \tag{6}$$

where $I_{R,corrected}(x,y)$ and $I_{G,corrected}(x,y)$ are the corrected first and second wavelength channels (e.g., red and green images).

In an exemplary embodiment, the system 100 can recover the translational shift between the corrected first wavelength channel and the corrected second wavelength channel (e.g., red and green channels). The system 100 can determine the translational shift between the corrected first wavelength channel and the corrected second wavelength channel based on two different approaches.

In an exemplary embodiment, the system 100 can determine the transitional shift based on the cross-correlation between the first wavelength channel and the second wavelength channel. For example, the system 100 can plot the cross-correlation plot or the calibration curve 204. The system 100 can locate the maximum point of the cross-correlation plot or the calibration curve 204 to determine the translational shift. The system 100 can use this method to determine the translational shift when the two-channel images are identical to each other.

In an exemplary embodiment, the system 100 can calculate the translational shift based on maximization of the mutual information of the first wavelength channel and the second wavelength channel. For example, the system 100 can use an optimization scheme, such as gradient descent and/or conjugate gradient descent to maximize the mutual information (i.e., entropy) of the first wavelength channel and the second wavelength channel. The system 100 can use this method to determine the transitional shift when the two-channel images are not matching. Maximizing the mutual information (i.e., joint entropy) does not require the first wavelength image and the second wavelength image to match because the mutual information is a measure of the similarity of the images and does not require the digital signal of the images to be identical.

The system 100 can use an optimization scheme to maximize the mutual information of the first wavelength channel and the second wavelength channel with sub-pixel accuracy. In an example, the system 100 can use gradient descent optimization scheme to increase the processing speed. The system 100 can determine the transitional shift between the first wavelength channel and the second wavelength channel because the maximization of the mutual information improves the ability predict the signal in the first wavelength image based on the signal intensity in the second wavelength image or vice-versa.

The system 100 can determine the defocus distance based on the calibration curve 204 shown in FIG. 2 based on the determined translational shift between the first wavelength channel and the second wavelength channel.

Figure 3A:
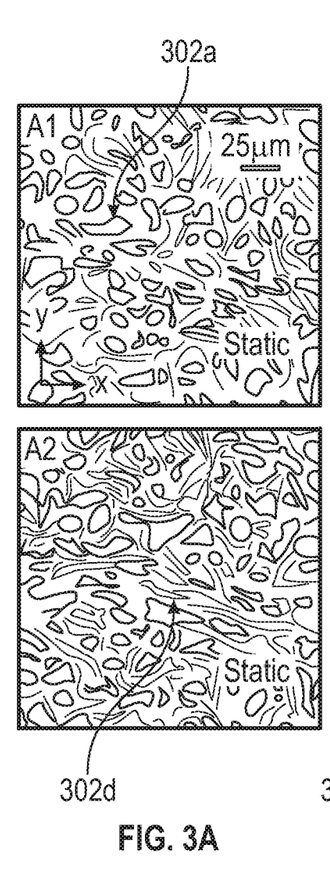
FIG. 3 illustrates a digital image of the sample in a static position and with motion blur when the sample is in continuous motion according to the present disclosure.
Figure 3B:
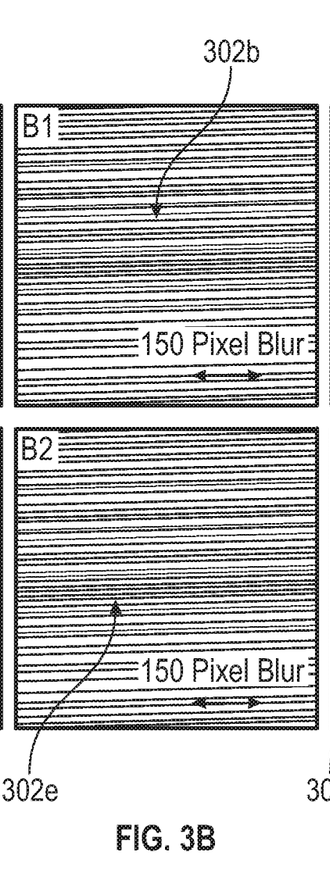
Figures 3C, 3D, 3E:
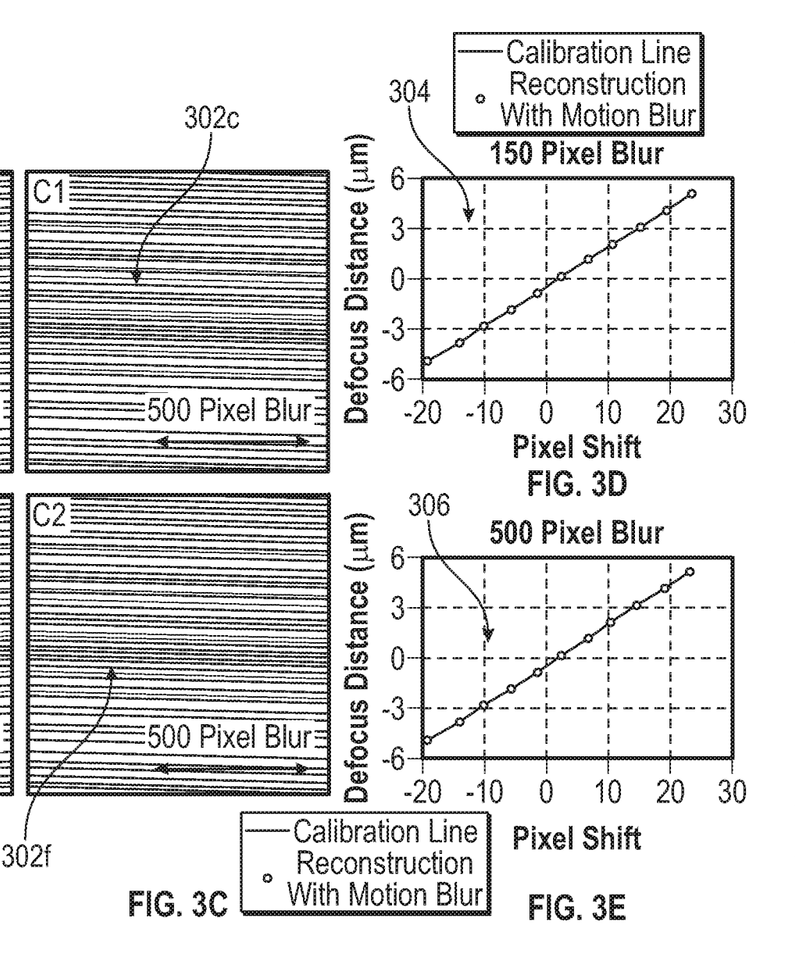

With reference to FIG. 3, the system 100 illustrates tracking of the focus position when the sample 104 is in continuous motion. As described above with reference to FIG. 2, the first wavelength channel and the second wavelength channel have a translational shift in the y-direction. The system 100 can autofocus when motion blur is introduced in the x-direction. For example, the system 100 can autofocus even when the sample 104 is in continuous motion in the x-direction.

FIG. 3 illustrates images of the sample 104 with the sample 104 in a static position and with motion blur introduced. The captured images 302a, 302d are static images of the sample 104 in the first and second wavelength channels (e.g., red and green channels) when the sample 104 is not moving relative to the microscope system 102. The captured images 302b and 302c, illustrate images that correspond to the static captured imaged 302a with different amounts of motion blur along the x-direction. Similarly, the captured images 302e, 302f illustrate images that correspond to the static captured imaged 302a with different amounts of motion blur along the x-direction. The captured images 302b, 302e, 302c and 302f depict pixel shift compared with defocus distance for a 150 pixel blur and a 500 pixel blur.

The system 100 captures color digital images 302a-f of the sample 104 when the sample 104 is positioned at different known defocus distances. The system 100 calculates the translational shifts using a mutual-information approach and plots the data points shown in the curves 304 and 304. The system 100 can calibrate the sample 104 motion based on the correlation between the calculated translational shifts and the known defocus distance. The system 100 can autofocus even in the presence of motion blur if the blur is along a direction perpendicular to the direction of the translational shift.

In an exemplary embodiment, system 100 can recover the defocus position with continuous sample motion. The system 100 can acquire a regular bright field high-resolution image of the sample 104. The system 100 can move the x-y stage (i.e., the sample 104) to the next position and turn on the first wavelength light source 106 and the second wavelength light source 108 (e.g., red and green light sources) to illuminate the sample 104 from two different incident angles. The system 100 can then capture the color digital image 202a-j when illuminated with the first wavelength light source 106 and the second wavelength light source 108 (e.g., red-and-green color multiplexed illumination). The system 100 can determine a color crosstalk correction for the first wavelength channel and the second wavelength channel as discussed above. The system 100 can determine the translational shift between the first wavelength channel and the second wavelength channel (e.g., red and the green channels) as discussed above. The system 100 can move the z-stage (i.e., the position of the sample 104) to the focus position based on the translational shift. The system 100 can repeat the method discussed above from acquiring the bright field high-resolution image to focusing based on the transitional shift for other tiles of the tissue slide. In an exemplary embodiment, the system 100 can position the sample 104 such that the microscope system 102 and the sample 104 are at a specific defocused position based on the translational shift.

Figure 4:
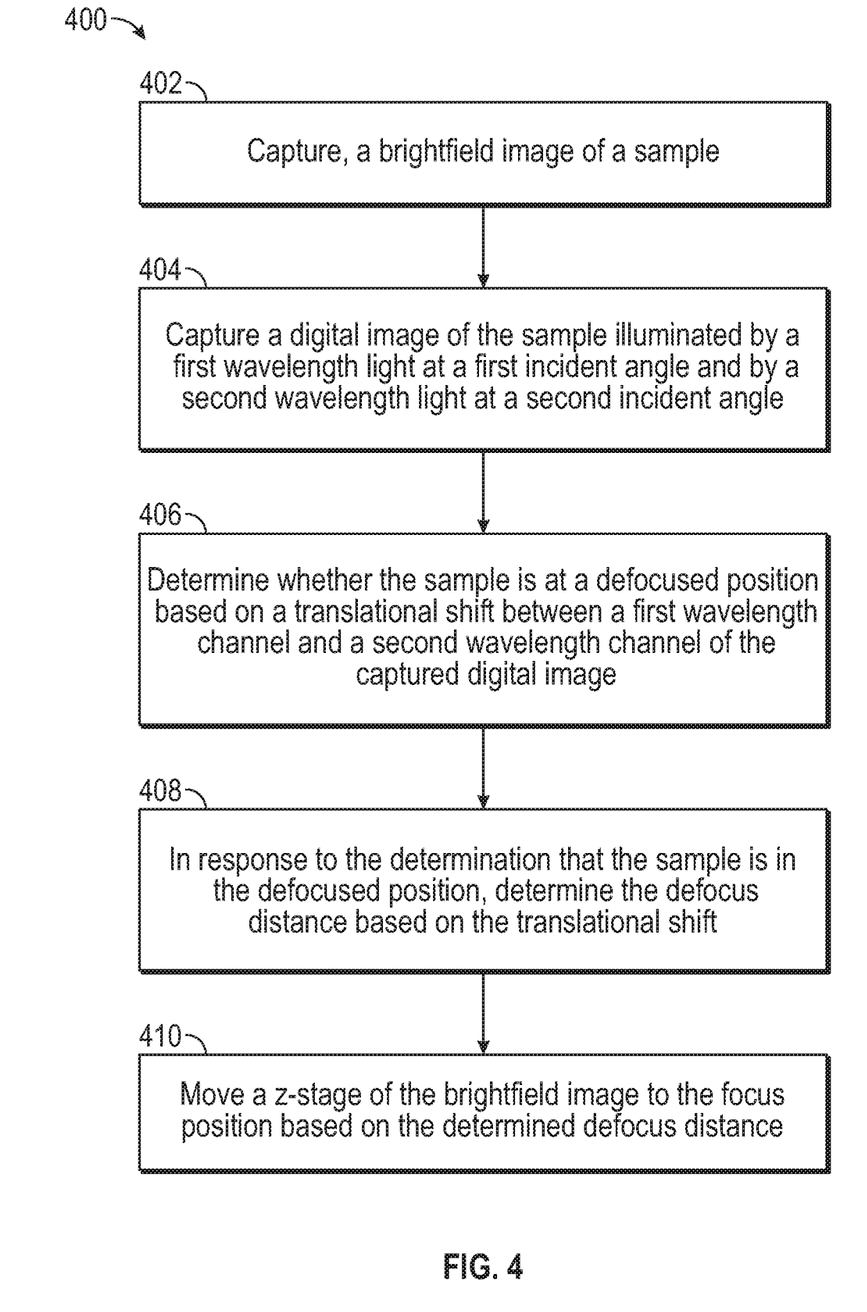
FIG. 4 is a flow chart of whole slide imaging according to the present disclosure.

With reference to FIG. 4, an exemplary flow chart of whole slide imaging according to the present disclosure is provided. The operations 402-410 describe autofocusing when the sample 104 is in static or in continuous motion. In operation 402, the microscope system 102 can capture a regular bright field high-resolution image of the sample 104. In an example, the system 100 can capture a high-resolution image using the microscope system 102 at a specific position or tile of the sample 104.

In operation 404, the system 100 can move the x-y stage (i.e., the sample 104) to the next position and turn on the first wavelength light source 106 and the second wavelength light source 108 (e.g., red and green light sources) to illuminate the sample 104 from two different incident angles. In examples, as discussed above, either the microscope system 102, the sample 104 or both may move to reposition the sample 104. The microscope system 102 can then capture the color digital image 202a-j when illuminated with the first wavelength light source 106 and the second wavelength light source 108 (e.g., red-and-green color multiplexed illumination).

In operation 406, the system 100 can determine the color crosstalk correction for the first wavelength channel and the second wavelength channel. For example, as discussed above, system 100 can use a color crosstalk model to determine the correlation and determine a corrected first wavelength channel and a corrected second wavelength channel.

In operation 408, the system 100 can determine the translational shift between the first wavelength channel and the second wavelength channel (e.g., red and the green channels) based on the corrected first wavelength channel and the corrected second wavelength channel.

In operation 410, the system 100 can move the z-stage (i.e., the position of the sample 104) to the focus position based on the determined translational shift.

In operation 412, the system 100 can repeat the method discussed above from acquiring the bright field high-resolution image to focusing based on the transitional shift for other tiles of the tissue slide or sample 104. For example, the system 100 can generate an in-focus high-resolution image of the tiles of the sample 104. The system 100 can use this method to determine the whole slide image of the sample 104 based on the in-focus high resolution images of the plurality of tiles of the sample 104.

Figure 5:
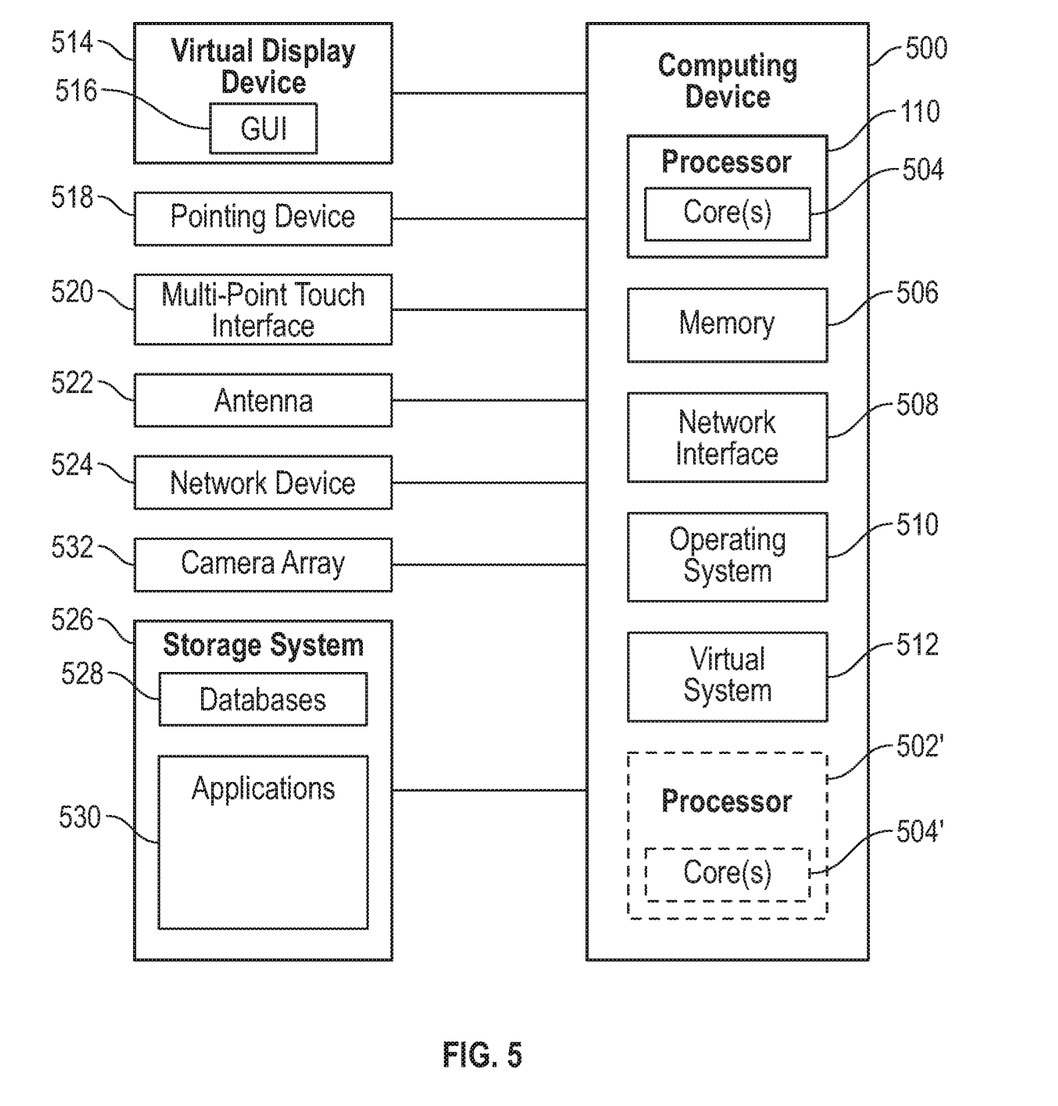
FIG. 5 illustrates a block diagram of an exemplary computing device for implementing exemplary embodiments of the present disclosure.

With reference to FIG. 5, a block diagram of an example computing device for implementing exemplary embodiments of the present disclosure is illustrated. An exemplary embodiment of the disclosed whole slide imaging system can be implemented by the computing device. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 806 included in the computing device 500 may store computer-readable and computer-executable instructions or software (e.g., applications 530) for implementing exemplary operations of the computing device 500. The computing device 500 also includes configurable and/or programmable processor 502 and associated core(s) 504 and, optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments of the present disclosure. Processor 502 and processor(s) 502' may each be a single core processor or multiple core (504 and 504') processor. Either or both of processor 502 and processor(s) 502' may be configured to execute one or more of the instructions described in connection with computing device 500.

The computing device 500 may include a microscope system with a digital camera 102 to capture digital images. The microscope system 102 may include multiple image capturing devices configured to capture digital images including multi-color images and high-resolution images. The image capturing device can capture moving images or static images.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof. A user may interact with the computing device 500 through a visual display device 514, such as a computer monitor, which may display one or more graphical user interfaces 516, multi touch interface 520, and a pointing device 518. The computing device 500 may also include one or more storage devices 526, such as a hard-drive, CD-ROM, or other computer readable media, for storing data and computer-readable instructions and/or software that implement exemplary embodiments of the present disclosure (e.g., applications). For example, exemplary storage device 526 can include one or more databases 528 for storing information regarding the physical objects. The databases 528 may be updated manually or automatically at any suitable time to add, delete, and/or update one or more data items in the databases.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between the computing device 500 and a network and/or between the computing device 800 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 500 and performing the operations described herein. In exemplary embodiments, the operating system 510 may be run in native mode or emulated mode. In an exemplary embodiment, the operating system 510 may be run on one or more cloud machine instances.

An exemplary flowchart is provided herein for illustrative purposes and is a non-limiting example of a method. One of ordinary skill in the art will recognize that exemplary methods may include more or fewer steps than those illustrated in the exemplary flowcharts.

The invention claimed is:

1. A system to capture a whole slide image, the system comprising:
 a microscope system with a digital camera, configured to capture a digital image of a sample; and
 a computing system operatively coupled to the camera, the computing system programmed to:
  capture a bright field image of the sample;
  capture a digital image of the sample illuminated by a first wavelength light at a first incident angle and by a second wavelength light at a second incident angle;
  determine whether the sample is at a defocused position based on a translational shift between a first wavelength channel and a second wavelength channel of the captured digital image;
  in response to the determination that the sample is in the defocused position, determine a defocus distance based on the transitional shift; and
  move a z-stage of the bright field image to a focus position based on the determined defocus distance;
 wherein the computing system is further configured to:
  determine a cross-talk first wave length channel and a cross-talk second wavelength channel of the captured digital image of the sample illuminated at the first and second incident angles with a first and a second wavelength light simultaneously;
  determine a first wavelength channel of the captured image illuminated with the first wavelength light at the first incident angle;
  determine a second wavelength channel of the captured image illuminated with the second wavelength light at the second incident angle;
  determine cross-talk coefficients based on the cross-talk first wavelength channel, the cross-talk second wavelength channel, the first wavelength channel and the second wavelength channel; and
  determine a corrected first wavelength channel and a corrected second wavelength channel based on the cross-talk first wavelength channel, the second wavelength channel and the cross-talk coefficients;
 wherein in determining the transitional shift, the computing system is configured to:
  maximize mutual information between the corrected first wavelength channel and the corrected second wavelength channel based on gradient descent; and
 wherein the computing system is further configured to:
  generate an in focus high-resolution image of a plurality of tiles of the sample; and
  generate the whole slide image of the sample based on the in focus high-resolution images of the plurality of tiles of the sample.

2. The system in claim 1, wherein the sample is illuminated from the first incident angle with a red light source and from the second incident angle with a green light source.

3. The system in claim 1, wherein the sample is illuminated from the first incident angle with a red light source and from the second incident angle with a blue light source.

4. The system in claim 1, wherein the sample is illuminated from the first incident angle with a green light source and from the second incident angle with a blue light source.

5. The system in claim 1, wherein the sample is illuminated from the first incident angle with a green light source and from the second incident angle with a blue light source and from a third incident angle with a red light source.

6. The system in claim 1, wherein the first wavelength light and/or the second wavelength light is at least one of a light emitting diode, a laser diode and a halogen lamp with a filter.

7. The system in claim 1, wherein in determining the transitional shift, the computing system is configured to:
   plot a cross-correlation between the corrected first wavelength channel and the corrected second wavelength channel; and
   determine a maximum point of the cross-correlation plot.

8. A method to capture a whole slide image of a sample, the method comprising:
   capturing, via a camera, a bright field image of a sample;
   capturing, via the camera, a digital image of the sample illuminated from a first incident angle at a first wavelength and a second incident angle at a second wavelength;
   determining, via a computing system, whether the sample is at a defocused position based on a transitional shift between a first wavelength channel and a second wavelength channel of the captured digital image;
   in response to the determination that the sample is in the defocused position, determining, via the computing system, a defocus distance based on the transitional shift; and
   moving a z-stage of the bright field image to a position where the image is in focus based on the determined defocus distance;
   determining, via the computing system, a cross-talk first wave length channel and a cross-talk second wavelength channel of the captured digital image of the sample illuminated at the first and second incident angles with a first and a second wavelength light simultaneously;
   determining, via the computing system, a first wavelength channel of the captured image illuminated with the first wavelength light at the first incident angle;
   determining, via the computing system, a second wavelength channel of the captured image illuminated with the second wavelength light at the second incident angle;
   determining, via the computing system, cross-talk coefficients based on the cross-talk first wavelength channel, the cross-talk second wavelength channel, the first wavelength channel and the second wavelength channel;
   determining, via the computing system, a corrected first wavelength channel and a corrected second wavelength channel based on the cross-talk first wavelength channel, the second wavelength channel and the cross-talk coefficients;
   maximizing mutual information between the corrected first wavelength channel and the corrected second wavelength channel based on gradient descent;
   generating, via the computing system, an in focus high-resolution image of a plurality of tiles of the sample; and
   generating, via, the computing system, the whole slide image of the sample based on the in focus high-resolution images of the plurality of tiles of the sample.

9. The method in claim 8, wherein the sample is illuminated from the first incident angle with a red light source and from the second incident angle with a green light source.

10. The method in claim 8, wherein the sample is illuminated from the first incident angle with a red light source and from the second incident angle with a blue light source.

11. The method in claim 8, wherein the sample is illuminated from the first incident angle with a green light source and from the second incident angle with a blue light source.

12. The method in claim 8, wherein the sample is illuminated from the first incident angle with a green light source and from the second incident angle with a blue light source and from a third incident angle with a red light source.

13. The method in claim 8, wherein the first wavelength and/or the second wavelength light source is at least one of a light emitting diode, a laser diode and a halogen lamp with a filter.

14. The method in claim 8, further comprising,
   plotting, via the computing system, a cross-correlation between the corrected first wavelength channel and the corrected second wavelength channel; and
   determining, via the computing system, a maximum point of the cross-correlation plot.

* * * * *